(12) United States Patent
Nose et al.

(10) Patent No.: US 10,995,687 B2
(45) Date of Patent: May 4, 2021

(54) EXHAUST GAS CONTROL APPARATUS FOR INTERNAL COMBUSTION ENGINE

(71) Applicant: TOYOTA JIDOSHA KABUSHIKI KAISHA, Toyota (JP)

(72) Inventors: Yuki Nose, Kasugai (JP); Yuto Ikeda, Toyota (JP); Keichi Myojo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/716,722

(22) Filed: Dec. 17, 2019

(65) Prior Publication Data

US 2020/0217258 A1 Jul. 9, 2020

(30) Foreign Application Priority Data

Jan. 8, 2019 (JP) .............................. JP2019-000932

(51) Int. Cl.
| | |
|---|---|
| *F01N 3/00* | (2006.01) |
| *F02D 41/02* | (2006.01) |
| *F01N 9/00* | (2006.01) |
| *F01N 3/023* | (2006.01) |
| *F01N 3/035* | (2006.01) |
| *F02D 41/40* | (2006.01) |

(52) U.S. Cl.
CPC ........... *F02D 41/029* (2013.01); *F01N 9/002* (2013.01); *F01N 3/023* (2013.01); *F01N 3/035* (2013.01); *F01N 2550/04* (2013.01); *F01N 2560/06* (2013.01); *F02D 41/405* (2013.01); *F02D 2200/0802* (2013.01)

(58) Field of Classification Search
CPC ...... F02D 41/029; F02D 41/405; F01N 9/002; F01N 3/023; F01N 3/035; F01N 2550/04; F01N 2560/06
USPC .......................................................... 60/295
See application file for complete search history.

(56) References Cited

U.S. PATENT DOCUMENTS

| | | | | |
|---|---|---|---|---|
| 8,322,130 B2 * | 12/2012 | Yuza | ................... | F02D 41/1446 60/286 |
| 8,826,650 B2 * | 9/2014 | Yamada | .................. | F04B 49/00 60/295 |

(Continued)

FOREIGN PATENT DOCUMENTS

| | | |
|---|---|---|
| JP | 2009-167906 A | 7/2009 |
| JP | 2010-168913 A | 8/2010 |
| JP | 2018-178981 A | 11/2018 |

*Primary Examiner* — Jason D Shanske
(74) *Attorney, Agent, or Firm* — Oblon, McClelland, Maier & Neustadt, L.L.P.

(57) ABSTRACT

An exhaust gas control apparatus includes: a fuel injection valve configured to inject fuel into an internal combustion engine; a catalyst provided in an exhaust passage and configured to clean exhaust gas; a filter provided on a downstream side of the catalyst; a fuel introducing unit configured to introduce the fuel, which is injected from the fuel injection valve, into the exhaust passage from the internal combustion engine in an unburnt state; and a load control unit configured to control an upper limit of a load on the internal combustion engine. In the exhaust gas control apparatus, the load control unit is configured to set, when the fuel is supplied to the exhaust passage in the unburnt state, the upper limit of the load to a second limit value lower than a first limit value, which is an upper limit of the load before the injection.

4 Claims, 3 Drawing Sheets

(56) References Cited

U.S. PATENT DOCUMENTS

| | | | |
|---|---|---|---|
| 10,156,174 B2* | 12/2018 | Pannuzzo | B01D 46/0057 |
| 2008/0060347 A1* | 3/2008 | Tominaga | F01N 3/0821 |
| | | | 60/284 |
| 2009/0178390 A1 | 7/2009 | Yahata et al. | |
| 2010/0180578 A1 | 7/2010 | Goda | |
| 2016/0097337 A1* | 4/2016 | Ito | F02D 41/065 |
| | | | 701/104 |
| 2018/0142599 A1 | 5/2018 | Pannuzzo et al. | |

* cited by examiner

EXHAUST GAS CONTROL APPARATUS FOR INTERNAL COMBUSTION ENGINE

INCORPORATION BY REFERENCE

The disclosure of Japanese Patent Application No. 2019-000932 filed on Jan. 8, 2019 including the specification, drawings and abstract is incorporated herein by reference in its entirety.

BACKGROUND

1. Technical Field

The disclosure relates to an exhaust gas control apparatus for an internal combustion engine.

2. Description of Related Art

An exhaust passage of an internal combustion engine is provided with a catalyst and a filter that clean exhaust gas generated from the internal combustion engine. Examples of the catalyst to be used include a selective catalytic reduction catalyst (SCR catalyst) that removes a nitrogen oxide ($NO_x$). The filter collects particulate matter (PM).

The filter can be regenerated by burning the PM deposited on the filter. For example, there is known a technology for regenerating the filter by changing the oxygen concentration in the exhaust gas through lean-burn in the internal combustion engine (for example, Japanese Unexamined Patent Application Publication No. 2018-178981 (JP 2018-178981 A)).

SUMMARY

The filter can be regenerated such that the temperature of the exhaust gas is increased by supplying unburnt fuel to the catalyst. When the temperature of the filter increases excessively, however, the filter is damaged. The disclosure provides an exhaust gas control apparatus for an internal combustion engine in which damage to a filter can be reduced.

A first aspect of the disclosure relates to an exhaust gas control apparatus. The exhaust gas control apparatus includes a fuel injection valve, a catalyst, a filter, a fuel introducing unit, and a load control unit. The fuel injection valve is configured to inject fuel into an internal combustion engine. The catalyst is provided in an exhaust passage of the internal combustion engine, and is configured to clean exhaust gas. The filter is provided on a downstream side of the catalyst in the exhaust passage, and is configured to collect particulate matter. The fuel introducing unit is configured to introduce the fuel, which is injected from the fuel injection valve, into the exhaust passage from the internal combustion engine in an unburnt state. The load control unit is configured to control an upper limit of a load on the internal combustion engine. In the exhaust gas control apparatus, the load control unit is configured to set, when the fuel is supplied to the exhaust passage in the unburnt state, the upper limit of the load to a second limit value lower than a first limit value, which is an upper limit of the load before the injection.

The exhaust gas control apparatus according to the first aspect described above may further include a throttle valve provided in an intake passage of the internal combustion engine. In the exhaust gas control apparatus, the load control unit may be configured to control the upper limit of the load by controlling an upper limit of an opening degree of the throttle valve.

In the exhaust gas control apparatus according to the first aspect described above, the load control unit may be configured to set the upper limit of the load to the second limit value when the injection of the unburnt fuel is terminated.

The exhaust gas control apparatus according to the first aspect described above may further include an acquisition unit configured to acquire a cumulative amount of air flowing into the internal combustion engine from a time when the injection of the unburnt fuel is terminated. In the exhaust gas control apparatus, the load control unit may be configured to set the upper limit of the load to the second limit value when the fuel is supplied to the exhaust passage in the unburnt state and the cumulative amount is equal to or smaller than a predetermined amount. The load control unit may be configured to set the upper limit of the load to a value higher than the second limit value when the fuel is supplied to the exhaust passage in the unburnt state and the cumulative amount is larger than the predetermined amount.

It is possible to provide the exhaust gas control apparatus for the internal combustion engine in which damage to the filter can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An exhaust gas control apparatus 100 of an embodiment is described below with reference to the drawings. The exhaust gas control apparatus 100 is mounted on a hybrid vehicle.

Hybrid Vehicle

Figure 1:
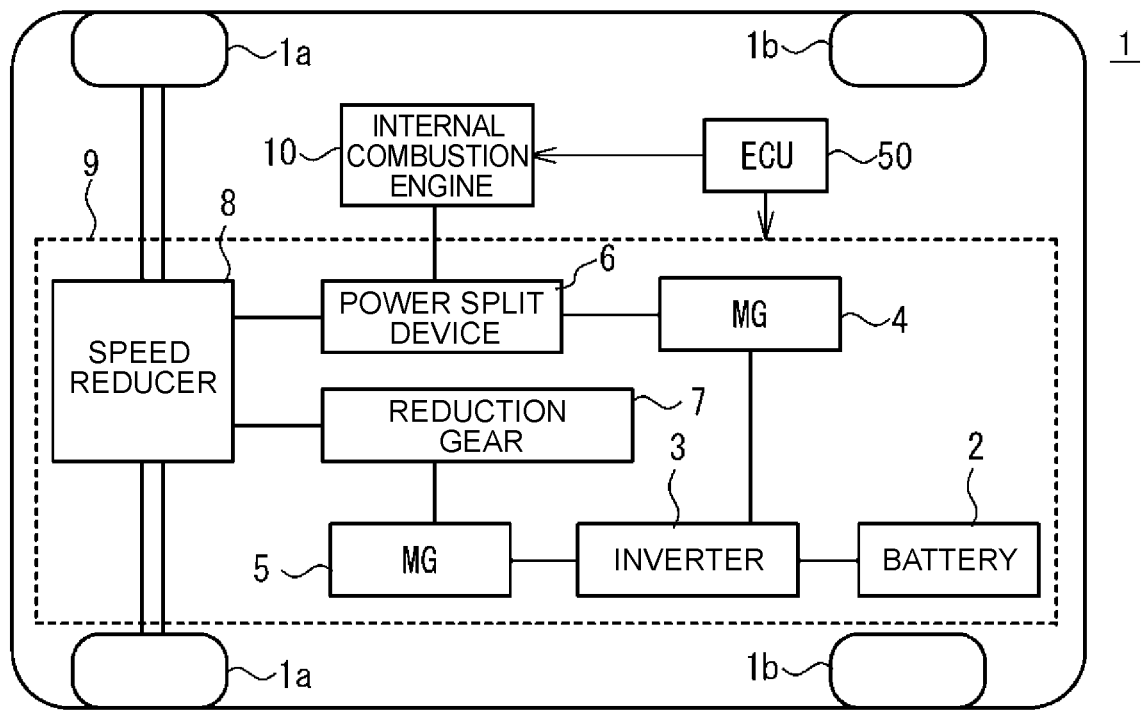
FIG. 1 is a schematic diagram illustrating an example of a hybrid vehicle.

FIG. 1 is a schematic diagram illustrating an example of a hybrid vehicle 1. As illustrated in FIG. 1, a hybrid system 9 and an internal combustion engine 10 (engine) are mounted on the hybrid vehicle 1, and the hybrid vehicle 1 includes driving wheels 1a and 1b. The hybrid vehicle 1 may be a plug-in hybrid vehicle in which a battery 2 is rechargeable by an external power supply. For example, the internal combustion engine 10 is a gasoline engine, which generates power by burning fuel.

Hybrid System

The hybrid system 9 includes the battery 2, an inverter 3, motor generators (MGs) 4 and 5, a power split device 6, a reduction gear 7, and a speed reducer 8. The MGs 4 and 5 have a motor function (power running) and a power generating function (regeneration), and are connected to the battery 2 via the inverter 3.

For example, the power split device 6 is composed of a planetary gear train including a sun gear, planetary gears, and a ring gear. The power split device 6 is coupled to the internal combustion engine 10 and the MG 4, and is also coupled to the driving wheels 1*a* via the speed reducer 8. Power output from the internal combustion engine 10 is split and transmitted to the driving wheels 1*a* and the MG 4 by the power split device 6. The reduction gear 7 is coupled to the MG 5, and is also coupled to the driving wheels 1*a* via the speed reducer 8. Power output from the MG 5 is transmitted to the driving wheels 1*a* via the reduction gear 7 and the speed reducer 8.

Direct-current power discharged from the battery 2 is converted into alternating-current power by the inverter 3, and is supplied to the MG 4 or 5. When the battery 2 is charged, alternating-current power generated by the MG 4 or 5 is converted into direct-current power by the inverter 3, and is supplied to the battery 2. A converter configured to step up or down the power may be connected to the battery 2. An electronic control unit (ECU) 50 is described later.

Exhaust Gas Control Apparatus

Figure 2:
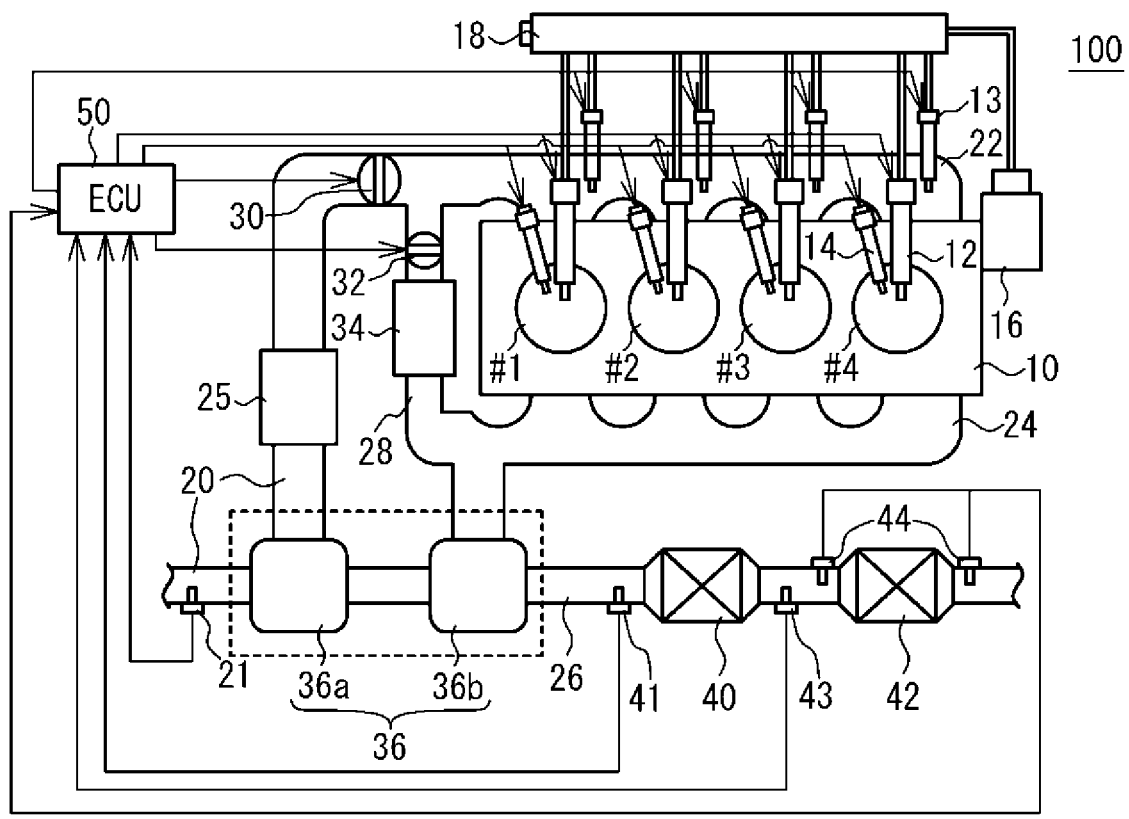
FIG. 2 is a schematic diagram illustrating an example of an exhaust gas control apparatus.

FIG. 2 is a schematic diagram illustrating an example of the exhaust gas control apparatus 100. As illustrated in FIG. 2, the exhaust gas control apparatus 100 is applied to the internal combustion engine 10, and includes the ECU 50, an SCR catalyst 40, and a filter 42.

For example, the internal combustion engine 10 is a four-cylinder gasoline engine including four cylinders #1 to #4, and is mounted on the vehicle. The cylinders #1 to #4 of the internal combustion engine 10 are connected to an intake manifold 22 and an exhaust manifold 24. An intake passage 20 is connected to an upstream side of the intake manifold 22. An exhaust passage 26 is connected to a downstream side of the exhaust manifold 24.

The intake passage 20 is provided with an air flow meter 21, a compressor 36*a* of a turbocharger 36, an intercooler 25, and a throttle valve 30 in this order from the upstream side. The air flow meter 21 measures the amount of air introduced into the intake passage 20. The compressor 36*a* rotates to supercharge the intake air. The intercooler 25 cools the intake air. The flow rate of the intake air is adjusted based on the opening degree of the throttle valve 30. The intake air is introduced into the cylinders #1 to #4 through the intake manifold 22.

Each cylinder is provided with a fuel injection valve 12 and a spark plug 14. The intake manifold 22 is provided with four fuel injection valves 13 in association with the cylinders. The fuel injection valves 12 and 13 are connected to a common rail 18. When high-pressure fuel is supplied from a pump 16 to the common rail 18 and the fuel injection valves 12 are opened, the fuel is injected into the cylinders. The fuel injection valves 13 perform port fuel injection. The internal combustion engine 10 only needs to have either or both the fuel injection valves 12 and 13.

In each cylinder, the fuel and air are compressed, and the spark plug 14 ignites an air-fuel mixture. Exhaust gas generated through combustion is exhausted through the exhaust manifold 24 and the exhaust passage 26.

The intake manifold 22 and the exhaust manifold 24 are connected by an exhaust gas recirculation (EGR) passage 28. A part of the exhaust gas passes through the EGR passage 28 to join the intake air in the intake manifold 22. The EGR passage 28 is provided with an EGR valve 32 and an EGR cooler 34. The circulation amount of the exhaust gas in the EGR passage 28 is adjusted by adjusting the opening degree of the EGR valve 32. The EGR cooler 34 reduces the temperature of the exhaust gas in the EGR passage 28.

The exhaust passage 26 is provided with a turbine 36*b* of the turbocharger 36, an air-fuel ratio sensor 41, the SCR catalyst 40, a temperature sensor 43, and the filter 42 in this order from the upstream side. When the exhaust gas flows in, the turbine 36*b* and the compressor 36*a* rotate to supercharge the intake air. The air-fuel ratio sensor 41 detects an air-fuel ratio. The temperature sensor 43 measures the temperature of the exhaust gas.

The SCR catalyst 40 is a selective catalytic reduction catalyst that removes $NO_x$ in the exhaust gas through reduction. Examples of the filter 42 include a gasoline particulate filter (GPF) formed of a porous ceramic or the like. The filter 42 collects particulate matter (PM) in the exhaust gas. A catalyst that promotes oxidation of PM may be supported on the filter 42. A differential pressure sensor 44 includes two pressure sensors provided on an upstream side and a downstream side of the filter 42. Based on pressures detected by the pressure sensors, the ECU 50 detects a differential pressure between the upstream side and the downstream side of the filter 42.

Regeneration processing for regenerating the filter 42 is performed such that the PM deposited on the filter 42 is removed by burning the PM. The PM is burnt when the temperature is equal to or higher than a predetermined temperature and exhaust gas containing oxygen flows into the filter 42. The temperature of the exhaust gas increases such that the fuel injected from the fuel injection valve 12 or 13 is introduced into the exhaust passage 26 without being burnt and the unburnt fuel flows into the SCR catalyst 40. The filter 42 is regenerated such that the generated high-temperature exhaust gas flows into the filter 42. The fuel injection intended to regenerate the filter 42 may be referred to as regenerative injection.

When the temperature of the filter 42 increases excessively, the filter 42 is damaged. During the filter regeneration, the temperature of the filter 42 increases because the PM deposited on the filter 42 is burnt. In particular, high-temperature exhaust gas is generated after the unburnt fuel is injected, and a large amount of high-temperature exhaust gas flows into the filter 42 when the hybrid vehicle 1 is accelerated after the injection. Therefore, the temperature may increase significantly. In this embodiment, the temperature increase of the filter 42 is suppressed by reducing a load rate (load factor) of the internal combustion engine 10.

The ECU 50 includes a central processing unit (CPU) and storage devices such as a random access memory (RAM) and a read only memory (ROM). The ECU 50 performs various types of control by executing programs stored in the ROM or other storage devices. The ECU 50 can acquire the air amount detected by the air flow meter 21, and accumulates the air amount within a predetermined period. The ECU 50 acquires the air-fuel ratio detected by the air-fuel ratio sensor 41, acquires the temperature of the exhaust gas that is acquired by the temperature sensor 43, and acquires the differential pressure between the upstream side and the downstream side of the filter 42 based on the pressures detected by the differential pressure sensor 44.

The ECU 50 controls the fuel injection by the fuel injection valves 12 and 13 and the ignition by the spark plug 14, and also controls the opening degrees of the throttle valve 30 and the EGR valve 32. The ECU 50 functions as a fuel introducing unit configured to introduce fuel into the exhaust passage 26 in an unburnt state by causing at least one of the fuel injection valves 12 and 13 to inject the fuel and avoiding the ignition by the spark plug 14. The ECU 50 functions as a load control unit configured to set a limit value of the load rate of the internal combustion engine 10. The ECU 50 controls the load rate to be equal to or lower than the limit value by controlling the opening degree of the throttle valve 30.

Figure 3:
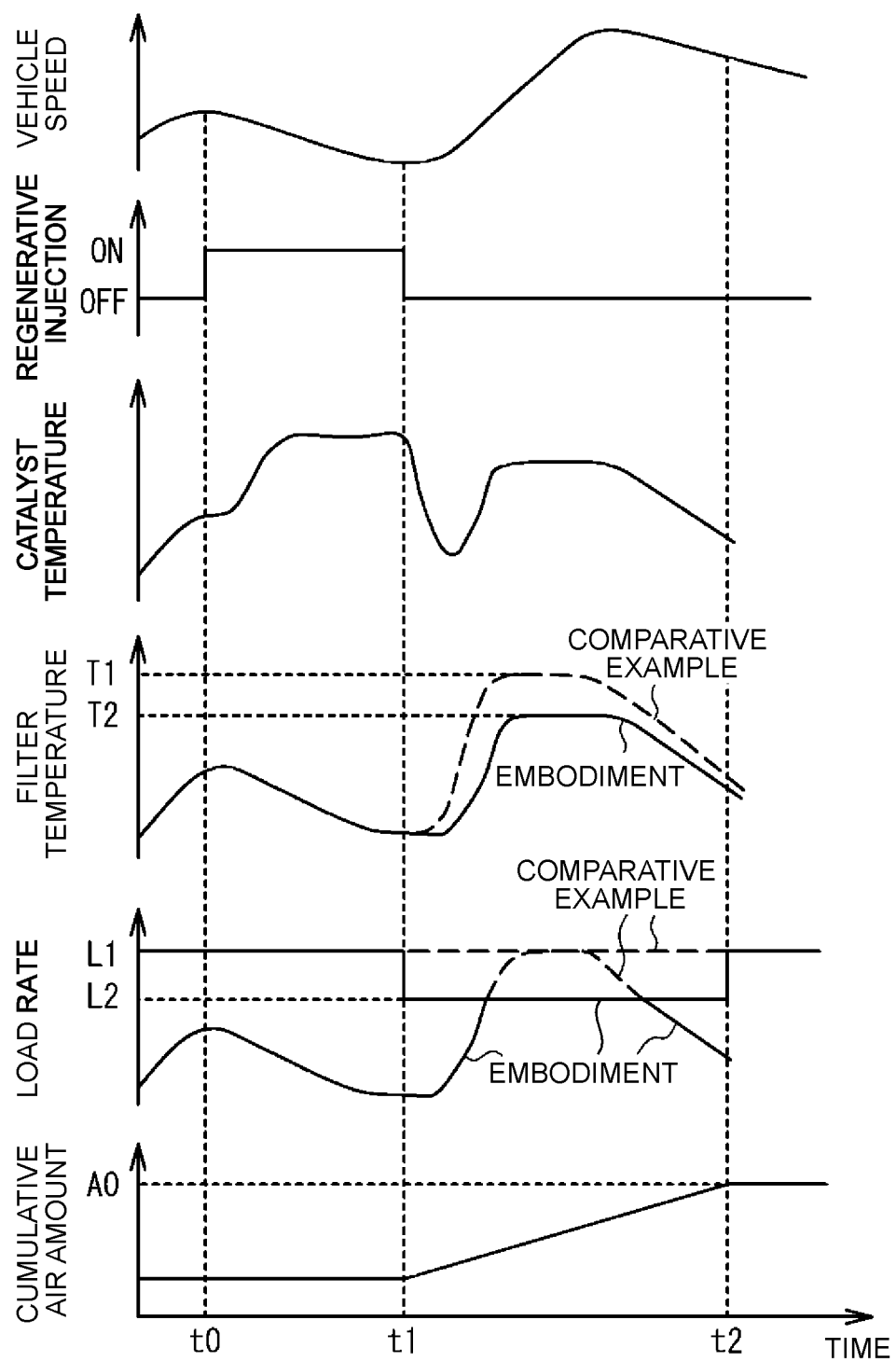
FIG. 3 is a time chart of an embodiment.

FIG. 3 is a time chart of this embodiment, and illustrates a vehicle speed, the regenerative injection, the temperature of the SCR catalyst 40 (catalyst temperature), the temperature of the filter 42 (filter temperature), the load rate of the internal combustion engine 10, and a cumulative air amount in this order from the top. In FIG. 3, dashed lines represent a comparative example, and continuous lines represent the embodiment.

The load rate is the ratio of a load to a maximum load set as 100%. An increase and a decrease in the load rate mean an increase and a decrease in the load, respectively. For example, the load corresponds to the opening degree of the throttle valve 30. The opening degree of the throttle valve 30 increases as the load and the load rate increase. Reference characters L1 and L2 represent limit values (upper limits) of the load rate. L2 is lower than L1. For example, L2 is 70% or higher and 90% or lower of L1. The cumulative air amount is a cumulative value of the amount of air introduced into the intake passage 20 after a time t1.

As illustrated in FIG. 3, the regenerative fuel injection is started at a time t0, and is terminated at the time t1. The catalyst temperature increases through the regenerative injection. The vehicle speed decreases during the regenerative injection, and increases after the injection. For example, the ECU 50 controls the opening degree of the throttle valve 30 (load) depending on a driver's accelerator depression degree.

In the comparative example, the limit value of the load rate is constant at L1. The load rate increases after the regenerative injection is terminated, and reaches the upper limit L1. Therefore, the high-temperature exhaust gas flows from the SCR catalyst 40 to the filter 42, and the filter temperature also increases to reach T1. As a result, the filter 42 may be melted due to heat.

In the embodiment, the limit value of the load rate is L1 before the time t1 and after a time t2, and the limit value is L2 lower than L1 during a period from t1 to t2. Therefore, the load rate after the regenerative injection is L2 at the maximum, and is lower than that of the comparative example. Thus, the flow rate of the exhaust gas is reduced, and the temperature increase of the filter 42 is suppressed. As illustrated in FIG. 3, the filter temperature does not increase to T1, but to T2 lower than T1. Then, the filter temperature decreases. Accordingly, damage to the filter 42 is reduced.

At the time t2, the cumulative air amount measured after the regenerative injection is terminated reaches A0. At this time, the limit value of the load rate returns from L2 to L1. When the cumulative air amount reaches A0, a sufficient amount of exhaust gas flows, and the exhaust gas whose temperature is increased through the regenerative injection may flow out to the downstream side of the filter 42. Thus, the possibility of damage to the filter 42 is small even if the limit value returns to L1.

Figure 4:
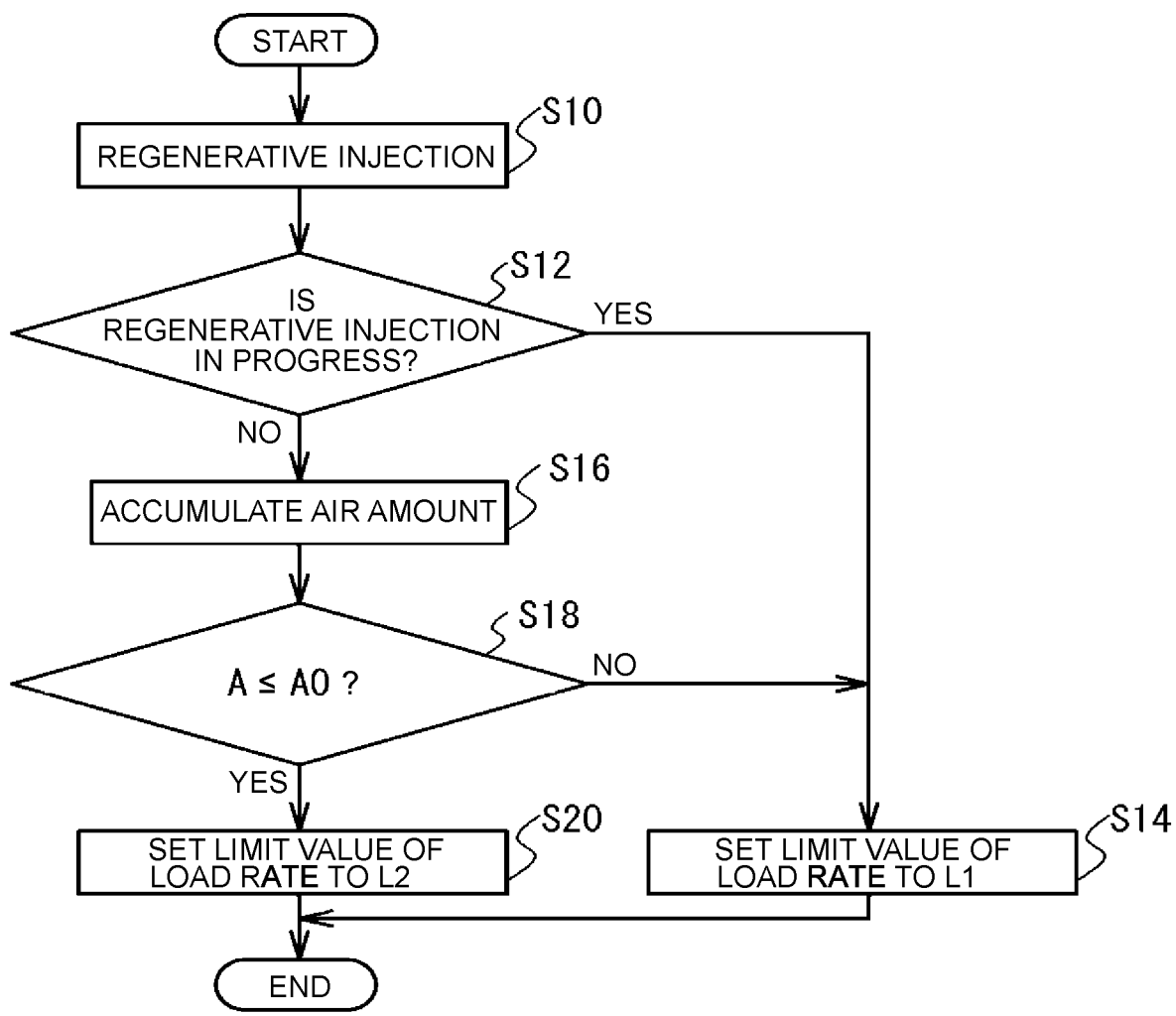
FIG. 4 is a flowchart illustrating an example of control to be executed by an ECU.

FIG. 4 is a flowchart illustrating an example of control to be executed by the ECU 50. As illustrated in FIG. 4, the ECU 50 executes the regenerative injection (Step S10), and introduces the fuel injected from at least one of the fuel injection valves 12 and 13 into the exhaust passage 26 without burning the fuel. The ECU 50 determines whether the regenerative injection is in progress (Step S12). When a result of the determination is positive (Yes), the ECU 50 sets the limit value of the load rate to L1 (Step S14). This state corresponds to the period from the time t0 to the time t1 in FIG. 3.

When the result of the determination is negative (No), the ECU 50 accumulates the air amount to acquire a cumulative air amount A (Step S16), and determines whether the cumulative air amount A is equal to or smaller than A0 (Step S18). When a result of the determination is negative, the ECU 50 sets the limit value of the load rate to L1 (Step S14). This state corresponds to the period after the time t2 in FIG. 3. When the result of the determination is positive, the ECU 50 sets the limit value of the load rate to L2 (Step S20). This state corresponds to the period from the time t1 to the time t2 in FIG. 3. Through the steps described above, the control is terminated.

According to this embodiment, after the unburnt fuel is supplied, the ECU 50 sets the limit value of the load rate to L2 lower than the limit value L1 before the supply. Thus, the high-temperature exhaust gas does not easily flow into the filter 42, and the temperature increase of the filter 42 is suppressed. Accordingly, the temperature is limited to about T2 lower than T1. As a result, damage to the filter 42 is reduced.

Specifically, the limit value of the load rate corresponds to an upper limit of the opening degree of the throttle valve 30. That is, the upper limit of the opening degree is lower in the case where the limit value is L2 than the case where the limit value is L1. Thus, the opening degree is reduced to reduce the amount of air to be introduced into the internal combustion engine 10 and the amount of exhaust gas to be exhausted from the internal combustion engine 10. As a result, the temperature increase of the filter 42 due to the exhaust gas is suppressed.

The limit value may be set from L1 to L2 at any time after the injection is terminated. However, the drivability decreases because the load is limited during acceleration after the regenerative injection. The ECU 50 sets the limit value to L1 during the injection of the unburnt fuel, and sets the limit value to L2 during the period from t1 at the termination to t2. By reducing the limit value to L2 simultaneously with the termination of the injection, the flow rate of the exhaust gas whose temperature is increased due to influence of the unburnt fuel is reduced, whereby the temperature increase of the filter 42 can be suppressed effectively. Further, the decrease in the drivability is suppressed. For example, the ECU 50 may change the limit value to L2 during the injection (t0 to t1).

As illustrated in FIG. 3, the filter temperature increases to T2 after the regenerative injection. Therefore, the PM deposited on the filter 42 is burnt. According to this embodiment, it is possible to achieve both the regeneration of the filter 42 and the suppression of the excessive temperature increase of the filter 42.

The ECU 50 acquires the cumulative air amount A measured after the regenerative injection is terminated. When the cumulative air amount A is equal to or smaller than the threshold A0, the limit value is set to L2 (t1 to t2 in FIG. 3). When the cumulative air amount A is larger than A0, the limit value is set to L1 (after t2). During the period from t1 to t2 in FIG. 3, the exhaust gas whose temperature is increased through the regenerative injection flows into the filter 42. Therefore, the temperature may increase excessively. Thus, the temperature increase is suppressed by setting the limit value to L2. When the cumulative air amount A is larger than A0, the high-temperature exhaust gas flows on the downstream side of the filter 42. Therefore, the possibility of the excessive temperature increase is small even if the limit value is increased from L2 to L1. By setting the limit value to L1, the opening degree of the throttle valve 30 increases. Thus, the power of the internal combustion engine 10 can be increased. As a result, the power desired by the driver is obtained, and the drivability is improved. After the time t2, the limit value only needs to be higher than L2, and may be equal to or different from L1.

As illustrated in FIG. 1, the hybrid vehicle 1 includes the MG 5 as the drive source in addition to the internal combustion engine 10. Thus, the MG 5 may generate the driving force during the period in which the load rate is limited to L2 as in the period from the time t1 to the time t2 in FIG. 3. Accordingly, the drivability is improved.

The internal combustion engine 10 is the gasoline engine, and the filter 42 is the GPF. The internal combustion engine 10 may be a diesel engine, and the filter 42 may be a diesel particulate filter (DPF). In the diesel engine, the unburnt fuel is supplied through, for example, post-injection.

Although the preferred embodiment of the disclosure is described above in detail, the disclosure is not limited to the specific embodiment, and various modifications and changes may be made within the scope of the disclosure described in claims.

What is claimed is:

1. An exhaust gas control apparatus, comprising:
    a fuel injection valve configured to inject fuel into an internal combustion engine;
    a catalyst provided in an exhaust passage of the internal combustion engine and configured to clean exhaust gas;
    a filter provided on a downstream side of the catalyst in the exhaust passage and configured to collect particulate matter;
    a controller configured to
        control the fuel injection valve to introduce the fuel into the exhaust passage from the internal combustion engine in an unburnt state, and
        control an upper limit of a load on the internal combustion engine, wherein
    the controller is configured to set, after the fuel is supplied to the exhaust passage in the unburnt state, the upper limit of the load to a second limit value lower than a first limit value, which is an upper limit of the load before and during the injection, and
    the controller is configured to set the upper limit of the load to the second limit value upon termination of the injection of the unburnt fuel.

2. The exhaust gas control apparatus according to claim 1, further comprising a throttle valve provided in an intake passage of the internal combustion engine, wherein
    the controller is configured to control the upper limit of the load by controlling an upper limit of an opening degree of the throttle valve.

3. The exhaust gas control apparatus according to claim 1, the controller is further configured to acquire a cumulative amount of air flowing into the internal combustion engine from a time when the injection of the unburnt fuel is terminated, wherein:
    the controller is configured to set the upper limit of the load to the second limit value when the cumulative amount is equal to or smaller than a predetermined amount; and
    the load control unit is configured to set the upper limit of the load to a value higher than the second limit value when the cumulative amount is larger than the predetermined amount.

4. The exhaust gas control apparatus according to claim 1, wherein the second limit value is equal to 70% to 90% of the first limit value.

* * * * *